United States Patent
Kunugi

(10) Patent No.: US 9,861,891 B2
(45) Date of Patent: Jan. 9, 2018

(54) INFORMATION PROCESSING DEVICE AND GAME PROGRAM

(71) Applicant: DeNA Co., Ltd., Tokyo (JP)

(72) Inventor: Mitsuharu Kunugi, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 12 days.

(21) Appl. No.: 14/969,921

(22) Filed: Dec. 15, 2015

(65) Prior Publication Data

US 2016/0206958 A1    Jul. 21, 2016

(30) Foreign Application Priority Data

Jan. 19, 2015 (JP) .................................. 2015-007690

(51) Int. Cl.
| | |
|---|---|
| A63F 9/24 | (2006.01) |
| A63F 13/35 | (2014.01) |
| A63F 13/533 | (2014.01) |
| A63F 13/825 | (2014.01) |

(52) U.S. Cl.
CPC ............ *A63F 13/35* (2014.09); *A63F 13/533* (2014.09); *A63F 13/825* (2014.09)

(58) Field of Classification Search
CPC ......... A63F 13/35; A63F 13/825; A63F 13/53
See application file for complete search history.

(56) References Cited

U.S. PATENT DOCUMENTS

2003/0008710 A1 * 1/2003 Yamaoka .............. A63F 13/335 463/41
2015/0057072 A1 * 2/2015 Youda .................... A63F 13/30 463/25

FOREIGN PATENT DOCUMENTS

| JP | 5223031 B | 9/2013 |
|---|---|---|
| JP | 5526278 B1 | 6/2014 |
| JP | 5526294 B1 | 6/2014 |
| JP | 2015029626 A | 2/2015 |

OTHER PUBLICATIONS

Puzzle and Dragons. Wikipedia. Online. Accessed via the Internet. Accessed Feb. 21, 2017. <URL: https://en.wikipedia.org/wiki/Puzzle_%26_Dragons>.*
Drop Rates Explained. Puzzleanddragonsforum.com. Online. Sep. 3, 2013. Accessed via the Internet. Accessed Feb. 21, 2017. <URL: http://puzzleanddragonsforum.com/threads/drop-rates-explained.16975/>.*

(Continued)

*Primary Examiner* — Dmitry Suhol
*Assistant Examiner* — Carl V Larsen
(74) *Attorney, Agent, or Firm* — Procopio, Cory, Hargreaves & Savitch LLP

(57) ABSTRACT

When a particular game stage is selected by the player from the multiple game stages configured in the game stage information, the inventive information processing device extracts, from multiple game content objects configured in the game content information, those game content objects that are associated with the game content objects, which are associated with the selected game stage as fusion source material, and, prior to initiation of game play in the selected game stage, generates screen data providing on-screen display indicating that the extracted game content objects are the original pre-fusion game content objects that can be fused with the game content objects, which are associated with the selected game stage as fusion source material.

8 Claims, 11 Drawing Sheets

(56) References Cited

OTHER PUBLICATIONS

Power-Up Fusion. withoutthesarcasm.com. Online. Apr. 12, 2014. Acessed via the Internet. Accessed Feb. 21, 2017. <URL: https://www.withoutthesarcasm.com/power-up-fusion-puzzle-and-dragons/>.*

Puzzle & Dragons, Friday dungeon—Shrine of Spirits Expert—Guide, Resolve team—Beginner Team. Youtube.com. Online. Aug. 23, 2013. Accessed via the Internet. Accessed Feb. 21, 2017. <URL: https://www.youtube.com/watch?v=KjrEhUV_eX8>.*

Notice of Reasons for Rejection; JP Patent App. No. 2015-007690 dated Apr. 14, 2015.

* cited by examiner

| Character ID | Character Name | Character Image | Rarity | Initial Attack Strength | Initial Defense Strength | Initial Hit Points |
|---|---|---|---|---|---|---|
| 0001 | Character A |  | Common | 15 | 8 | 10 |
| 0002 | Character B |  | Uncommon | 30 | 20 | 15 |
| 0003 | Character C |  | Rare | 45 | 30 | 25 |
| 0004 | Character D |  | Super-rare | 60 | 55 | 60 |
| ... | ... | ... | ... | ... | ... | ... |

| Upper Attack Strength Limit | Upper Defense Strength Limit | Upper Hit Points Limit | Evolved Character | Skill | Fusion Information |
|---|---|---|---|---|---|
| 1500 | 800 | 1000 | 0010 | Skill A | Fusion Information (1) |
| 3000 | 2000 | 1500 | 0005 | Skill A | Fusion Information (2) |
| 4500 | 3000 | 2500 | 0020 | Skill B | Fusion Information (3) |
| 6000 | 5500 | 6000 | 0045 | Skill B | Fusion Information (4) |
| ... | ... | ... | ... | ... | ... |

FIG. 3

| Fusion Information (1) | |
|---|---|
| Source material character | The total number of source material characters |
| 0002 | 1 |
| 0003 | 1 |
| 0004 | 1 |

*Fusion Information (2)*
*Fusion Information (3)*

FIG. 4

| Stage ID | Stage name | Appearing character | |
|---|---|---|---|
| | | Character ID | Appearance rate |
| 001 | Stage 1 | 001 | 100% |
| 002 | Stage 2 | 002 | 100% |
| 003 | Stage 3 | 001 | 80% |
| | | 003 | 100% |
| 004 | Stage 4 | 002 | 80% |
| | | 003 | 60% |
| | | 004 | 100% |
| 005 | Stage 5 | 002 | 80% |
| | | 004 | 60% |
| | | 005 | 100% |
| ⋮ | ⋮ | ⋮ | ⋮ |

FIG. 5

| Player ID | Player name | Game points | Proprietary character information |
|---|---|---|---|
| 001 | Player A | 100 | Proprietary character information (1) |
| 002 | Player B | 50 | Proprietary character information (2) |
| ⋮ | ⋮ | ⋮ | ⋮ |

FIG. 6

INFORMATION PROCESSING DEVICE AND GAME PROGRAM

The present application claims the benefit of Japanese Patent Application No. JP2015-007690, filed on Jan. 19, 2015, the content of which is incorporated herein in its entirety by reference.

BACKGROUND

1. Technical Field

The present invention relates to an information processing device and a game program (e.g., non-transitory computer readable medium having machine-executable instructions with which a computer having a storage and a hardware processor).

2. Background Art

Game programs that allow a player to select a particular game stage from among multiple game stages, enable the player to engage in gameplay in the selected game stage, and allow the player to acquire game content objects associated with this game stage are known (for example, see Patent Document 1).

PRIOR ART DOCUMENT

Patent Document

[Patent Document 1]
Japanese Patent Publication No. 5,526,294

SUMMARY

In this game program (e.g., non-transitory computer readable medium having machine-executable instructions with which a computer having a storage and a hardware processor), game content objects acquired by the player in a game stage can be used as fusion source material to be fused with original pre-fusion game content objects. However, before gameplay is initiated in a game stage, the player may be unable to ascertain with which original pre-fusion game content objects the game content objects that may be acquired in this game stage can be utilized as fusion source material, without finding out more details about each of the original pre-fusion game content objects.

The present invention was devised by taking these circumstances into consideration, and it is an object of the invention to allow the player to readily ascertain the original pre-fusion game content objects that can use the game content objects, which may be acquired in the game stage as fusion source material, prior to initiation of gameplay in said game stage.

In order to solve the above-described problems, the main aspect of the present invention is an information processing device, which provides a game that makes it possible to fuse game content objects used as fusion source material with original pre-fusion game content objects, wherein said information processing device is provided with:

a storage module that stores game content information having game content objects as fusion source material configured therein in association with each game content object, and game stage information having game content objects that may be acquired by the player configured therein in association with each game stage;

an extraction processing module that extracts, from multiple game content objects configured in the game content information, those game content objects that are associated with game content objects, which are used as fusion source material and are the game content objects that are associated with the selected game stage when a particular game stage is selected by the player from the multiple game stages configured in the game stage information; and a screen data generation processing module that, prior to initiation of game play in the selected game stage, generates screen data that provides an on-screen display indicating that the extracted game content objects are original pre-fusion game content objects that can be fused with the game content objects, which are associated with the selected game stage as fusion source material.

Other features of the present invention will become apparent from this Specification and the accompanying Drawings.

BRIEF DESCRIPTION OF THE DRAWINGS

FIG. 3 A diagram illustrating an example data structure of character information.

FIG. 4 A diagram illustrating an example data structure of fusion information.

FIG. 5 A diagram illustrating an example data structure of game stage information.

FIG. 6 A diagram illustrating an example data structure of player information.

DETAILED DESCRIPTION

Figure 1:
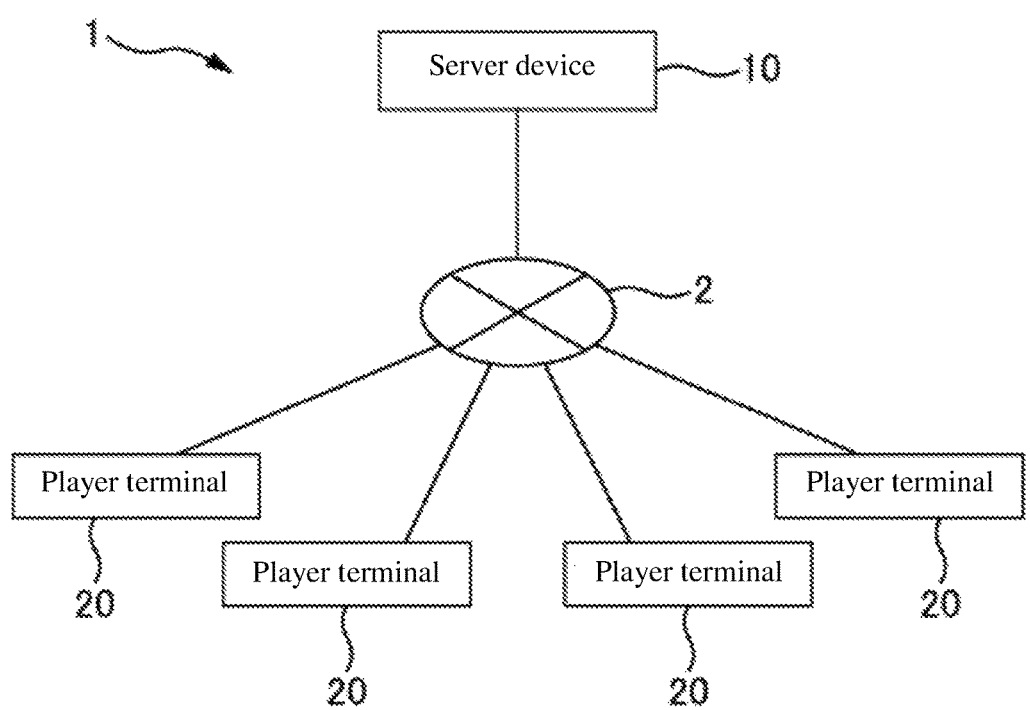
FIG. 1 A diagram illustrating an example configuration of the entire game system 1.

At least the following will be apparent from this Specification and the accompanying Drawings.

Namely, an information processing device, which provides a game that makes it possible to fuse game content objects used as fusion source material with original pre-fusion game content objects, wherein said information processing device is provided with:

a storage module that stores game content information having game content objects used as fusion source material configured therein in association with each game content object and game stage information having game content objects that may be acquired by the player configured therein in association with each game stage;

an extraction processing module that extracts, from multiple game content objects configured in the game content information, those game content objects that are associated with game content objects, which are used as fusion source material and are the game content objects that are associated with the selected game stage when a particular game stage is selected by the player from the multiple game stages configured in the game stage information; and a screen data generation processing module that, prior to initiation of game play in the selected game stage, generates screen data that provides an on-screen display indicating that the extracted game content objects are original pre-fusion game content objects that can be fused with the game content objects, which are associated with the selected game stage as fusion source material.

When the player selects a game stage, such an information processing device provides an on-screen display of original pre-fusion game content objects that can use the game content objects, which may be acquired in this game stage as fusion source material. Thus, prior to initiation of gameplay in the game stage, it becomes possible to enable the player to readily ascertain the original pre-fusion game content objects that are associated with the game content objects, which may be acquired in this game stage as fusion source material.

This information processing device may be adapted such that the storage module stores player information having configured therein multiple game content objects owned by the player, the extraction processing module extracts, from the multiple game content objects owned by the player, those game content objects that are associated with game content objects, which are used as fusion source material and are the game content objects that are associated with the selected game stage; and the screen data generation processing module generates screen data that provides an on-screen display indicating that said extracted game content objects of the player are original pre-fusion game content objects that can be fused with the game content objects, which are associated with the selected game stage as fusion source material.

Such an information processing device can enable the player to readily ascertain whether the original pre-fusion game content objects that are associated with the game content objects, which may be acquired in this game stage as fusion source material, are among the game content objects in his or her possession.

This information processing device may be adapted such that, when the player acquires the game content objects associated with said game stage after initiation of gameplay in the selected game stage, the screen data generation processing module generates screen data used to provide an on-screen display of an enquiry as to whether or not to fuse them with the player's extracted game content objects.

When the player successfully acquires the game stage-associated game content objects, such an information processing device makes it possible to reduce the time and effort needed to find the original pre-fusion game content objects that are associated with said game content objects as fusion source material from among the game content objects in the player's possession.

This information processing device may be adapted such that the information processing device is provided with a fusion processing module that automatically fuses said extracted game content objects of the player when the player acquires the game content objects associated with said game stage after initiation of gameplay in the selected game stage.

When the player successfully acquires the game stage-associated game content objects, such an information processing device makes it possible to save the time and effort needed to fuse this game content objects, as fusion source material, with the original pre-fusion game content objects in his or her possession.

This information processing device may be adapted such that, when the game content objects associated with the selected game stage appear after initiation of gameplay in the selected game stage, the screen data generation processing module generates screen data that provides an on-screen display indicating that these objects are game content objects used as fusion source material that can be automatically fused with said extracted game content objects of the player.

Such an information processing device makes it possible to increase the player's motivation to acquire game content objects that appear in a game stage.

This information processing device may be adapted such that the screen data generation processing module generates screen data used to provide on-screen display by varying the display behavior of the extracted game content objects according to the rate of appearance configured in the game content objects associated with the selected game stage.

Such an information processing device makes it possible to allow the player to readily ascertain whether the game content objects are original pre-fusion game content objects that are associated with the game content objects as fusion source material that are likely to be acquired in a game stage or, alternatively, whether these are original pre-fusion game content objects that are associated with the game content objects as fusion source material that are unlikely to be acquired in a game stage.

Next, a game program (e.g., non-transitory computer readable medium having machine-executable instructions with which a computer having a storage and a hardware processor) used to provide a game that makes it possible to fuse game content objects used as fusion source material with original pre-fusion game content objects, wherein said game program directs a computer to execute:

a process, whereby game content information having game content objects used as fusion source material configured therein in association with each game content object and game stage information having game content objects that may be acquired by the player configured therein in association with each game stage is stored in a storage module;

an extraction process that extracts, from multiple game content objects configured in the game content information, those game content objects that are associated with game content objects, which are used as fusion source material and are the game content objects that are associated with the selected game stage when a particular game stage is selected by the player from the multiple game stages configured in the game stage information; and a screen data generation process that, prior to initiation of game play in the selected game stage, generates screen data that provides an on-screen display indicating that the extracted game content objects are original pre-fusion game content objects that can be fused with the game content objects, which are associated with the selected game stage as fusion source material.

Such a game program makes it possible to allow the player to readily ascertain the original pre-fusion game content objects that are associated with the game content objects, which may be acquired in a game stage as fusion source material, prior to initiation of gameplay in said game stage.

Embodiment 1

<<Configuration of Game System 1>>

FIG. 1 is a diagram illustrating an example configuration of the entire game system 1. The game system 1 provides a variety of game-related services to players over a network 2

(for example, the Internet) and includes a server device 10 and multiple player terminals 20.

The game system 1 according to the present embodiment can provide the players with character battles conducted using character cards, as an example of game content objects (hereinafter referred to simply as "characters"), as well as with character fusion, whereby characters used as fusion source material (hereinafter referred to as "source material characters") are fused with original pre-fusion characters (hereinafter referred to as "base characters").

In the present embodiment, the term "character fusion" refers to a game in which fusion of source material characters with base characters is used for varying parameters configured in said base characters or evolution into new base characters with different character IDs.

In the present embodiment, the term "character battles" refers to a game in which a player character belonging to the player is directed to engage in combat with enemy characters that appear in each game stage. By consuming his or her own game points, the player can initiate battle play in a particular game stage selected from multiple game stages. As a result of conducting battle play in the game stage, the player may be able to acquire the enemy characters that appear (hereinafter referred to as "appearing characters"). Once the player has successfully acquired the appearing characters, character fusion can be performed using the appearing characters as fusion source material.

When the player selects a particular game stage during game stage selection in the present embodiment, the base characters that are associated with the enemy characters, which may be acquired in this game stage as source material characters, are displayed on screen. For this reason, the player can readily ascertain for which base characters the selected game stage is a valid game stage prior to initiation of game play.

<<Configuration of Server Device 10>>

Figure 2:
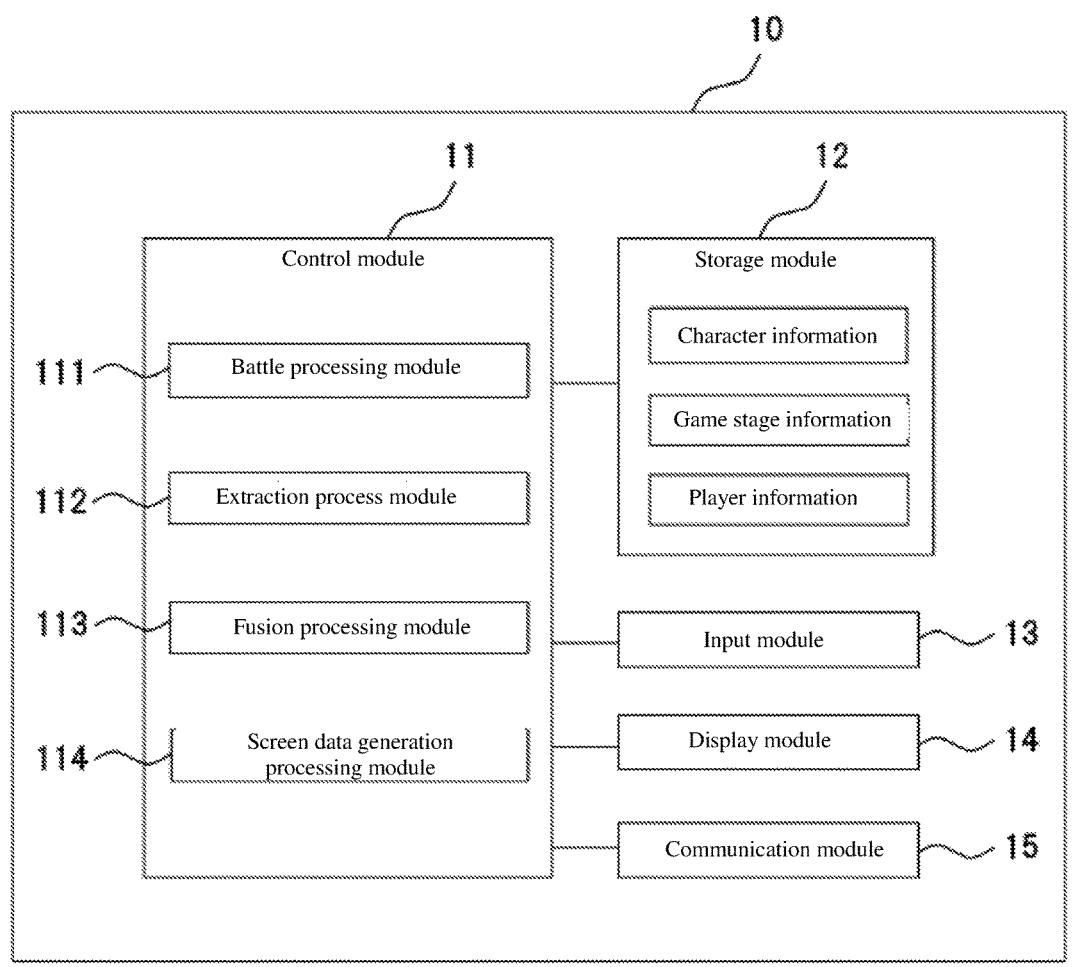
FIG. 2 A block diagram illustrating the functional configuration of the server device 10.

FIG. 2 is a block diagram illustrating the functional configuration of the server device 10. The server device 10 is an information processing device (for example, a workstation, a personal computer, etc.) used by a system administrator to operate and manage a variety of services. Upon receiving various commands (requests) from player terminals 20, the server device 10 transmits (responds by sending) game programs (e.g., non-transitory computer readable medium having machine-executable instructions with which a computer having a storage and a hardware processor) operational on the player terminals 20 and various types of data and web pages (game screens, etc.) created using a markup language (HTML, etc.) compliant with the specifications of the player terminals 20. The server device 10 has a control module 11, a storage module 12, an input module 13, a display module 14, and a communication module 15.

The control module 11, along with transferring data between the components, exercises overall control over the server device 10, and is implemented using a CPU (Central Processing Unit) that runs a predetermined program (e.g., non-transitory computer readable medium having machine-executable instructions with which a computer having a storage and a hardware processor) stored in memory. The control module 11 of the present embodiment is provided with at least a battle processing module 111, an extraction processing module 112, a fusion processing module 113, and a screen data generation processing module 114.

The battle processing module 111 possesses functionality for carrying out various types of character battle-related processing. When the player's operation input is accepted, the battle processing module 111 of the present embodiment conducts a character battle in accordance with this operation.

The extraction processing module 112 possesses functionality for carrying out processing whereby characters that satisfy predetermined conditions are extracted from among multiple characters. For example, characters, which can use the enemy characters that appear in a game stage as fusion source material, are extracted by the extraction processing module 112 of the present embodiment from among the multiple characters owned by the player.

The fusion processing module 113 possesses functionality for carrying out various types of character fusion-related processing. The fusion processing module 113 of the present embodiment varies the parameters configured in the base characters by fusing the source material characters with the base characters or evolving them into new base characters with different character IDs by fusing pre-associated specific source material characters with the base characters.

The screen data processing generation module 114 possesses functionality to carry out processing used to generate screen data for displaying a game screen on a player terminal 20. The screen data generation processing module 114 of the present embodiment generates HTML data as screen data corresponding to a game screen.

The storage module 12 has a ROM (Read Only Memory), which is a read-only storage area where operating system software is stored, and a RAM (Random Access Memory), which is a rewritable storage area used as a work area for arithmetic processing by the control module 11, and is implemented as a non-volatile storage device, such as a flash memory, a hard disk, or the like. The storage module 12 of the present embodiment stores at least character information (game content information), game stage information, and player information. It should be noted that the specifics of these various types of information will be described in detail further below.

The input module 13 is used by a system administrator, etc., for entering game service-related data of various types (e.g., character information, game stage information, and the like), and is implemented, for example, using a keyboard, a mouse, or the like.

The display module 14, which is used for displaying operation screens used by the system administrator in response to commands from the control module 11, is implemented, for example, as an LCD (Liquid Crystal Display), or the like.

The communication module 15, which is used for communication with the player terminals 20, has receiver functionality for receiving various types of data and signals transmitted from the player terminals 20 and transmitter functionality for transmitting various types of data and signals to the player terminals 20 in response to commands from the control module 11. The communication module 15 is implemented, for example, as a NIC (Network Interface Card), or the like.

FIG. 3 is a diagram illustrating an example data structure of character information. Said character information has configured therein, in correlation with a character ID, at least a character name, a character image, rarity, initial attack strength, initial defense strength, initial hit points, maximum attack strength, maximum defense strength, maximum hit points, evolved characters, skills, and fusion information. The term "skills" refers to information that shows the special attacks and other capabilities that this character activates during a battle. The term "evolved characters" refers to information that shows the character IDs associated with newly evolved characters. The term "fusion information"

refers to information that establishes correlations between the source material characters and base characters used for character fusion.

FIG. 4 is a diagram illustrating an example data structure of fusion information. Such fusion information has configured therein the number of characters, in correlation with the character IDs of the source material characters that are associated with the base characters. In the present embodiment, characters can be evolved into new base characters by fusing all those pre-associated source material characters with the base characters.

FIG. 5 is a diagram illustrating an example data structure of game stage information. The game stage information has at least a stage name and appearing characters configured in correlation with the stage ID. The term "appearing characters" represents information indicating the enemy characters that appear in the stage, or information on the rate of appearance configured therein in correlation with the character IDs of the appearing characters. The rate of appearance represents information indicating the probability of encountering the appearing characters during gameplay in this game stage.

FIG. 6 is a diagram illustrating an example data structure of player information. Such player information has configured therein, in correlation with player IDs, at least a player name, game points, and proprietary character information. The term "game points" refers to information indicating a point value that the player has and that is consumed when the player engages in combat in the game stage.

Figures 7, 8:
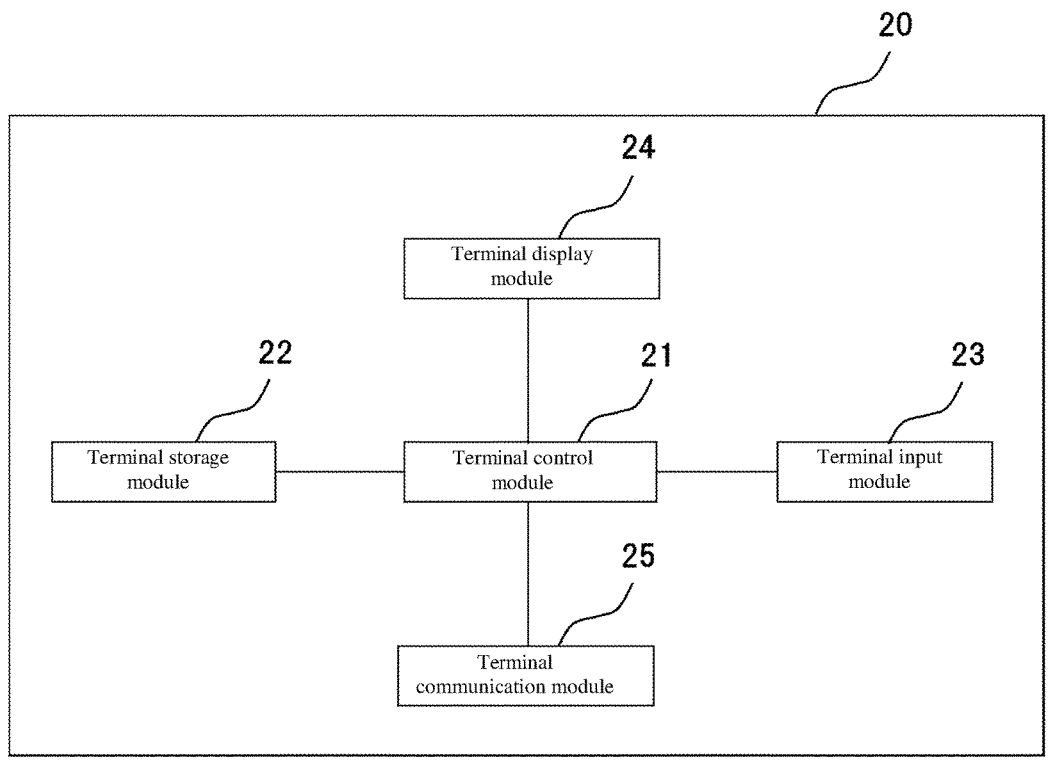
FIG. 7 A diagram illustrating an example data structure of proprietary character information.
FIG. 8 A block diagram illustrating the functional configuration of the player terminal 20.

FIG. 7 is a diagram illustrating an example data structure of proprietary character information. The term "proprietary character information" represents information relating to characters belonging to the player (hereinafter referred to as "proprietary characters"). Such proprietary character information has configured therein, in correlation with the character IDs of the proprietary characters, at least a current level, attack strength, defense strength, hit points, and other capability parameters.

<<Configuration of Player Terminal 20>>

FIG. 8 is a block diagram illustrating the functional configuration of a player terminal 20. The player terminals 20 are information processing devices owned and used by the players (e.g., tablet terminals, mobile phone terminals, smartphones, and the like). Due to the web browser functionality they possess, the player terminals 20 are capable of on-screen display of web pages (game screens, and the like) transmitted from the server device 10. A player terminal 20 has a terminal control module 21 used for overall control of the player terminal 20, a terminal storage module 22 used for storing various types of data and programs, a terminal input module 23 used by the player for operation input, a terminal display module 24 used for displaying game screens and operation screens, and a terminal communication module 25 used for communicating information to and from the server device 10.

<<Regarding Operation of Game System 1>>

An example of operation of the game system 1 according to the present embodiment will be illustrated below. The game system 1 according to the present embodiment carries out game stage selection-related operations, enquiry screen display-related operations, automatic character fusion-related operations, and notification screen display-related operations. Each example of operation will be illustrated in specific detail below.

<Game Stage Selection>

Figure 9:
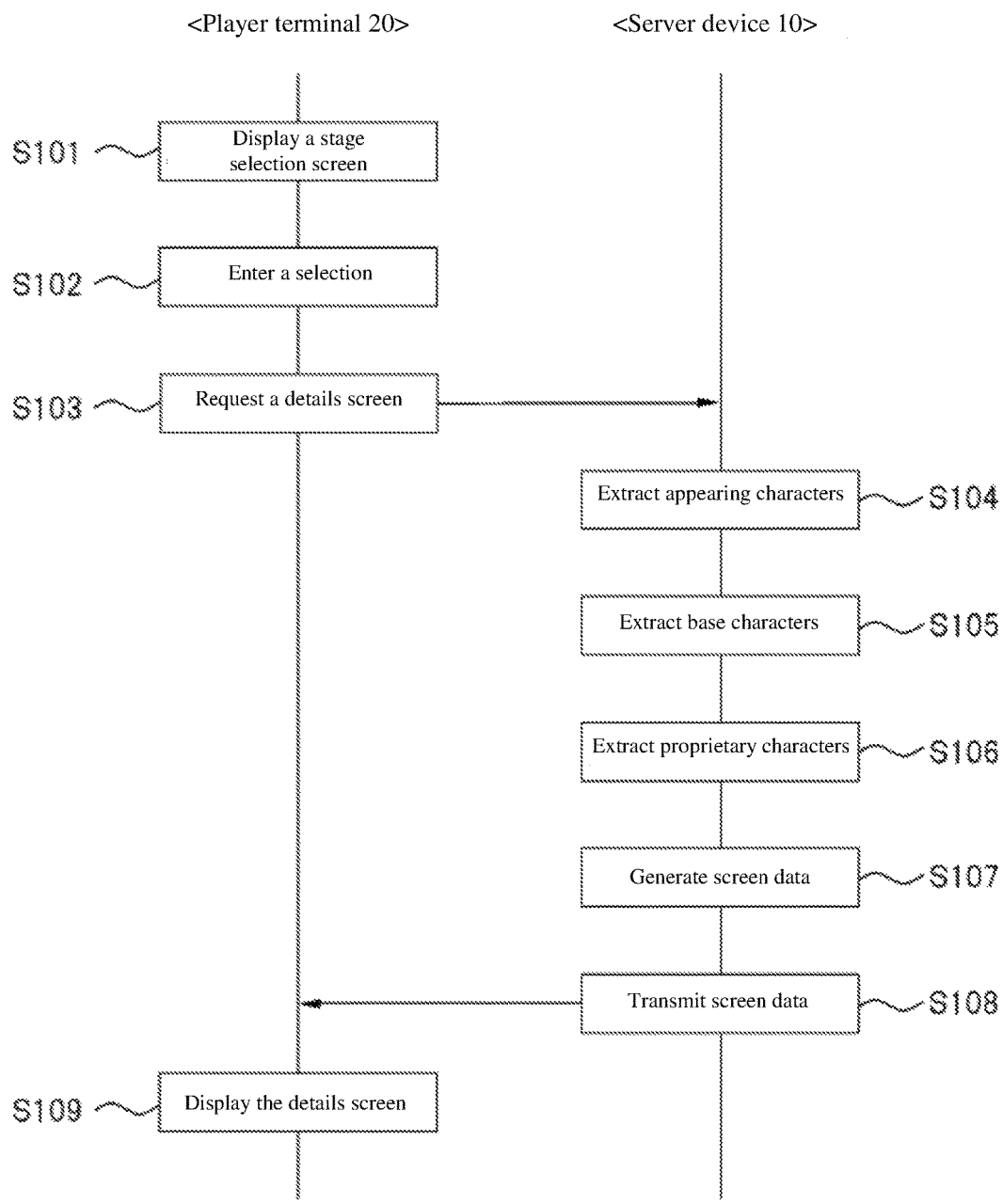
FIG. 9 A flow chart used to illustrate an example of operation related to game stage selection.

FIG. 9 is a flow chart used to illustrate an example of operation related to game stage selection.

First, the player terminal 20 uses screen data transmitted from the server device 10 to display a game stage selection screen intended to allow game stage selection by the player on the terminal display module 24 (Step S101).

Figure 10:
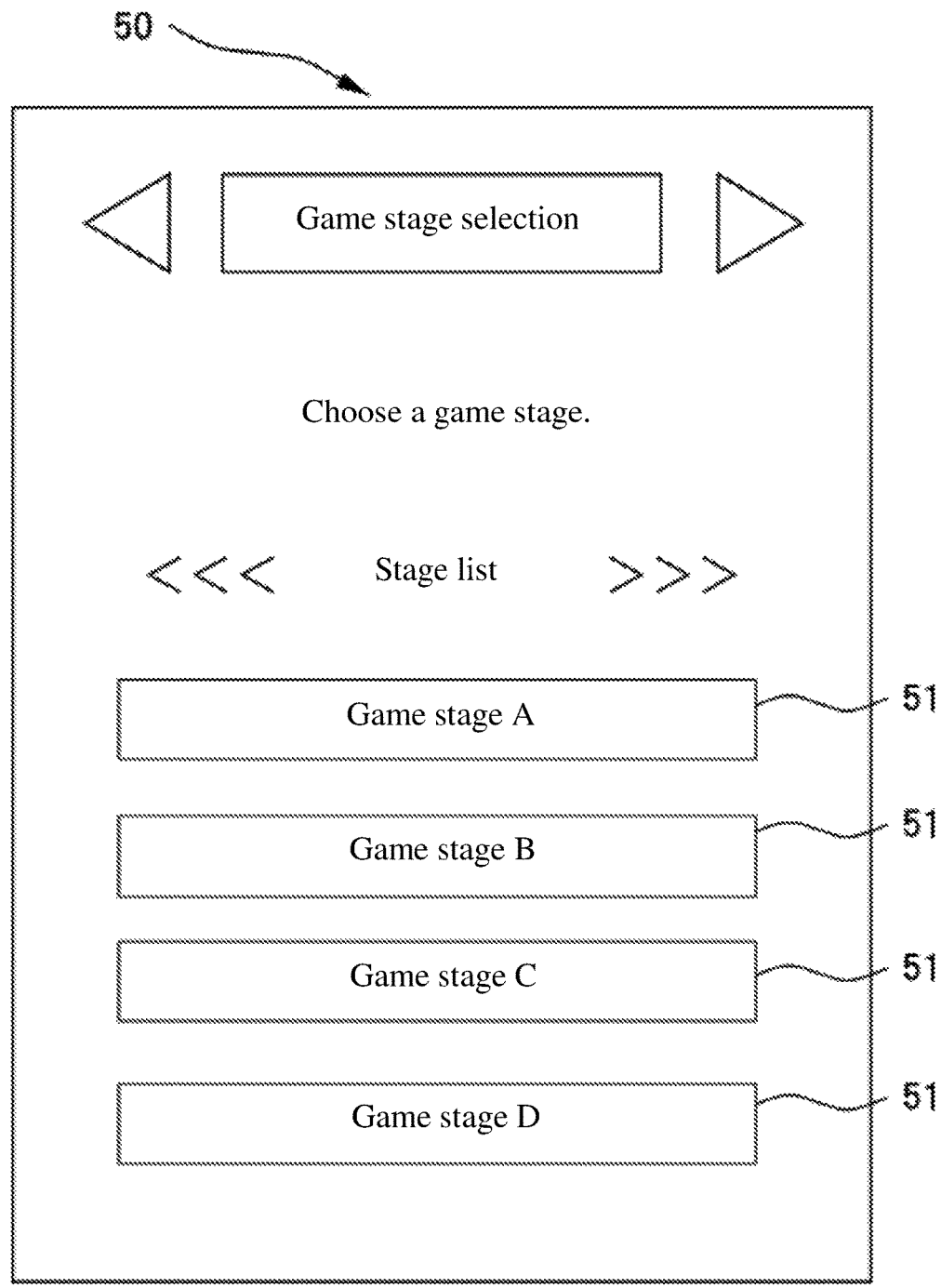
FIG. 10 A diagram illustrating an example game stage selection screen 50.

FIG. 10 is a diagram illustrating an example game stage selection screen 50. A list view of the candidate game stages is provided on this game stage selection screen 50. By selecting a particular control button 51, the player can specify the game stage, from among those on this list, where the character battle is to take place. The names of the game stages are respectively displayed on each individual control button 51.

Next, when a particular game stage is specified from among the multiple game stages listed as a result of the player's selection operation while the game stage selection screen 50 is displayed on the terminal display module 24 (Step S102), the player terminal 20 uses this operational information to transmit a command (a details screen request) requesting a details screen for the game stage to the server device 10 (Step S103).

Next, upon receiving the details screen request transmitted from the player terminal 20, the server device 10 executes a process to extract enemy characters that appear in the selected game stage (appearing characters) (Step S104). Specifically, the extraction processing module 112 uses the stage ID, etc. transmitted along with the details screen request from the player terminal 20, to refer to the game stage information illustrated in FIG. 5 and, based thereon, extracts the appearing characters associated with the game stage selected by the player from among the multiple characters configured in the character information illustrated in FIG. 3.

Next, the server device 10 executes a process to extract the base characters that are associated with the extracted appearing characters as source material characters (Step S105). Specifically, the extraction processing module 112 uses the character IDs of the extracted appearing characters to refer to the character information illustrated in FIG. 3 and the fusion information illustrated in FIG. 4 and, based thereon, extracts the base characters that are associated with the extracted appearing characters as source material characters from among the multiple characters configured in this character information.

Next, the server device 10 executes a process to extract the extracted base characters from among the player's proprietary characters (Step S106). Specifically, the extraction processing module 112 uses the character IDs of the extracted base characters to refer to the character information illustrated in FIG. 6 and the proprietary character information illustrated in FIG. 7 and, based thereon, extracts the proprietary characters that match the extracted base characters from among the multiple proprietary characters configured in the player's proprietary character information.

Next, once the proprietary characters, which are pre-associated with the appearing characters of the selected game stage as fusion source material, are extracted in this manner, the server device 10 directs the screen data generation processing module 114 to generate data for a game stage details screen (a web page) related to the selected game stage (Step S107). The server device 10 then transmits the data for the game stage details screen generated by the screen data generation processing module 114 to the requesting player terminal 20 over the network (Step S108).

Next, upon receiving the screen data transmitted from the server device 10, the player terminal 20 analyzes the screen data and uses it to display the game stage details screen on the terminal display module 24 (Step S109).

Figure 11:
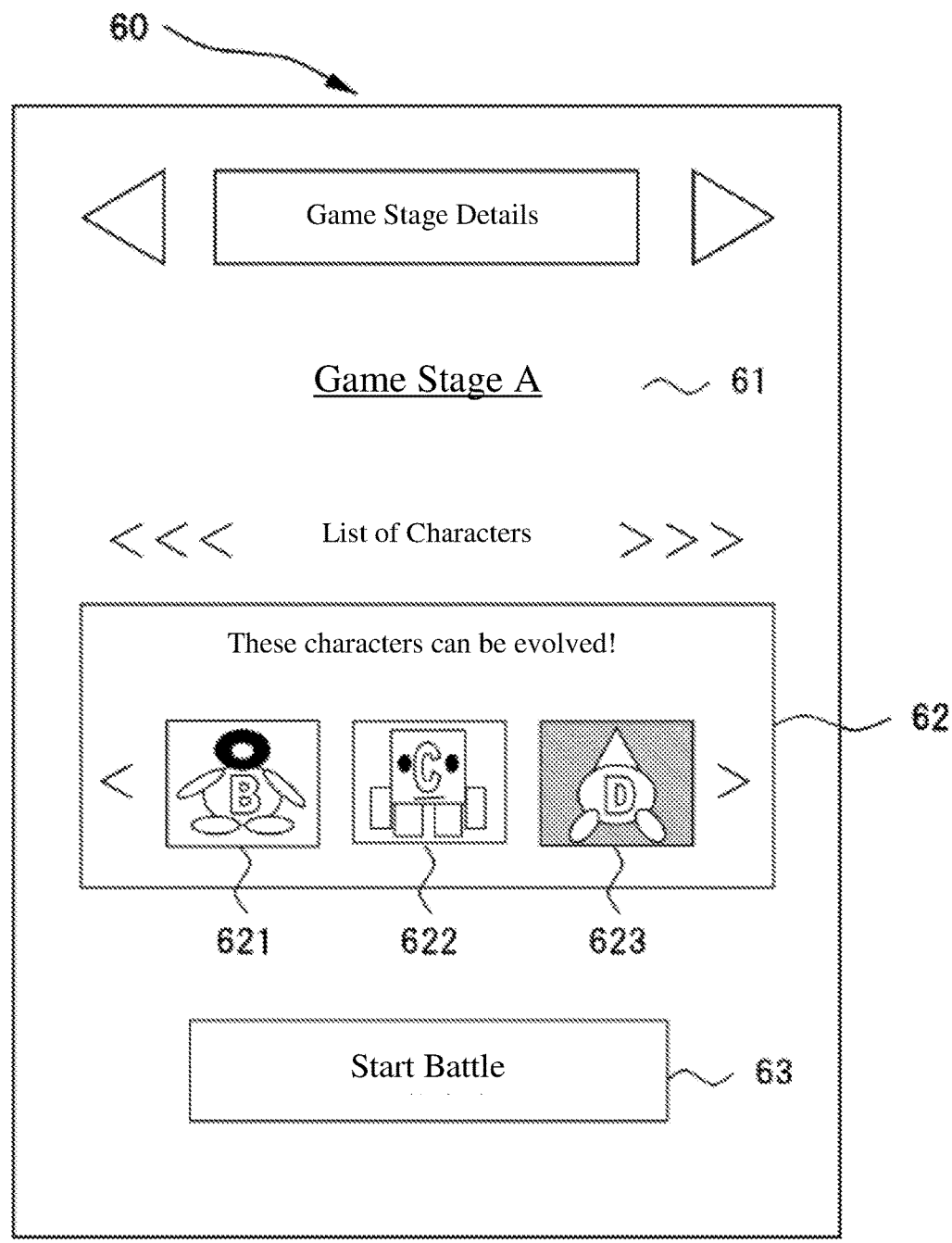
FIG. 11 A diagram illustrating an example game stage details screen 60.

FIG. 11 is a diagram illustrating an example game stage details screen 60. This game stage details screen 60 comprises a game stage 61, which is selected by the player on the game stage selection screen 50 illustrated in FIG. 10 (as assumed herein, "Game stage A" has been selected), a character display area 62 providing a list view of the base characters, which are pre-associated with the appearing characters of the selected game stage as fusion source material, and a control button 63, which is used for initiating a battle in the selected game stage.

In the character display area 62 of the present embodiment are placed some of the base characters from among the multiple base characters extracted by the extraction processing module 112. It should be noted that the rest of the base characters from among the multiple base characters extracted by the extraction processing module 112 may, via a specific operation by the player, be placed therein instead of these few characters. As shown herein, there are three characters placed in the area as examples of base characters, and the base characters 621 and 622, which are the player's proprietary characters, are displayed in a brighter color, while the base character 623, which is a non-proprietary character that doesn't belong to the player, is displayed in a darker color. In other words, when screen data for the game stage details screen 60 is generated, the screen data generation processing module 114 places (from among the base characters extracted in the above-described Step S105) the proprietary characters extracted in the above-described Step S106 in the character display area 62 such that they are displayed in a brighter color and places the remaining base characters that were not extracted in the above-described Step S106 (in other words, the non-proprietary characters) in the character display area 62 such that they are displayed in a darker color. In this manner, the way the listed base characters are displayed is varied depending on whether or not these are proprietary characters.

As a result of displaying the game stage details screen 60 in this manner, the player, prior to initiation of gameplay in a game stage, can readily ascertain whether the extracted characters are base characters that can be fused with the appearing characters, which are associated with the selected game stage as fusion source material. Furthermore, by viewing the listed base characters displayed in the character display area 62, the player can readily ascertain whether or not the base characters, which are associated with the appearing characters that may be acquired in the game stage as fusion source material, match any of the player's own proprietary characters. In addition, if the selected game stage is a game stage that is valid for the player's own base characters (in other words, if the player's own proprietary characters are contained in the character display area 62), the player can gain advantage in the game by initiating a character battle in this game stage by selecting the control button 63. On the other hand, if the selected game stage is a game stage that is not valid for the player's own base characters (in other words, if the player's own proprietary characters are not contained in the character display area 62), the number of useless battles can be reduced because the player can forgo a character battle in that game stage.

<Enquiry Screen Display>

Figure 12:
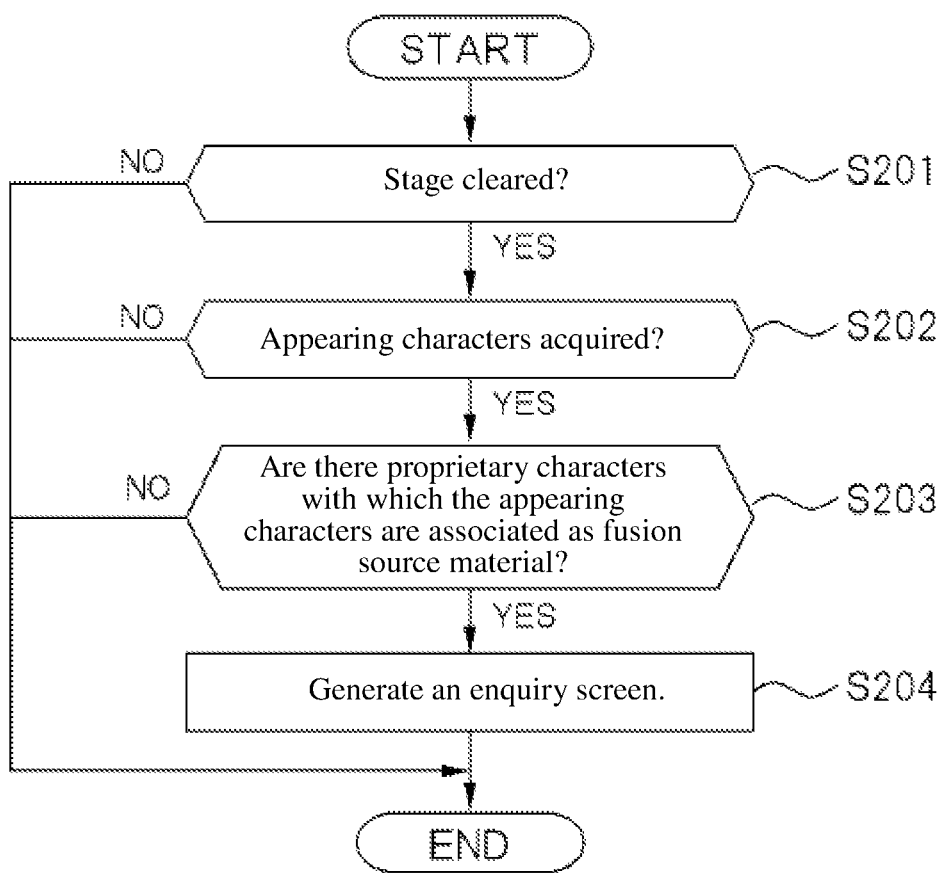
FIG. 12 A flow chart used to illustrate an example of operation related to enquiry screen display.

FIG. 12 is a flow chart used to illustrate an example of operation related to enquiry screen display. In this embodiment, enquiry screen display-related operations are carried out upon initiation of a character battle in the game stage selected by the player.

First, the battle processing module 111 determines whether or not the player has cleared the stage as a result of conducting a character battle in the game stage selected by the player (Step S201). Specifically, the battle processing module 111 determines one or many enemy characters appearing in the selected game stage, based on the rate of appearance of the appearing characters configured in the game stage information illustrated in FIG. 5. The battle processing module 111 then directs the determined enemy characters (appearing characters) to engage in battle with the player character. In other words, along with acquiring various parameters (attack strength, defense strength, hit points, and the like) configured in the player character by referring to the proprietary character information illustrated in FIG. 7, the battle processing module 111 acquires various parameters (upper attack strength limit, upper defense strength limit, upper hit point limit, and the like) configured in the appearing enemy characters by referring to the game stage information illustrated in FIG. 5 and the character information illustrated in FIG. 3. The battle processing module 111 then determines the winner of the battle based on the various parameters of these characters. If the player character is determined to be the winner, the battle processing module 111 awards the enemy characters defeated by the player to said player in accordance with predetermined probabilities. The battle processing module 111 then determines whether or not the stage has been cleared based on whether or not the player has satisfied predetermined conditions as a result of the battle. As a result, if said determination is negative, the process is terminated. On the other hand, if said determination is positive, the process advances to the next Step S202.

Next, if it is determined that the player has cleared the stage (Step S201: YES), the battle processing module 111 determines whether or not the player has acquired the enemy characters appearing in this game stage (appearing characters) (Step S202). If said determination is negative, the process is terminated. On the other hand, if said determination is positive, the process advances to the next Step S203.

Next, if it is determined that the player has acquired the appearing characters (Step S202: YES), the battle processing module 111 determines whether or not the player owns base characters that are associated with the appearing characters as source material characters (Step S203). Specifically, the extraction processing module 112 uses the character IDs of the acquired appearing characters to refer to the character information illustrated in FIG. 3 and the fusion information illustrated in FIG. 4 and, based thereon, extracts the base characters that are associated with the acquired appearing characters as source material characters from among the multiple characters configured in this character information. The extraction processing module 112 then uses the character IDs of the extracted base characters to refer to the character information illustrated in FIG. 6 and the proprietary character information illustrated in FIG. 7 and, based thereon, extracts the proprietary characters matching the extracted base characters from among the multiple proprietary characters configured in the player's proprietary character information. After that, once the extraction processing module 112 has successfully extracted proprietary characters in this manner, the battle processing module 111 determines that the player owns proprietary characters, which are associated with the appearing characters as source material characters, and determines that it doesn't own any if the extraction fails. If said determination is negative, the process is terminated. On the other hand, if said determination is positive, the process advances to the next Step S204.

Next, if it is determined that the player owns base characters that are associated with the acquired appearing characters as source material characters (Step S203: YES), the screen data generation processing module 114 generates an enquiry screen intended to enquire as to whether or not to use the acquired appearing characters as fusion source material with the extracted proprietary characters (Step S204). After that, the server device 10 transmits the generated screen data to the player terminal 20 over the network 2.

Displaying the enquiry screen on the player terminal 20 in this manner makes it possible to reduce the time and effort required to find the proprietary characters that are associated with the acquired appearing characters as source material characters from among the game content objects in the player's possession.

<Automatic Character Fusion>

Figure 13:
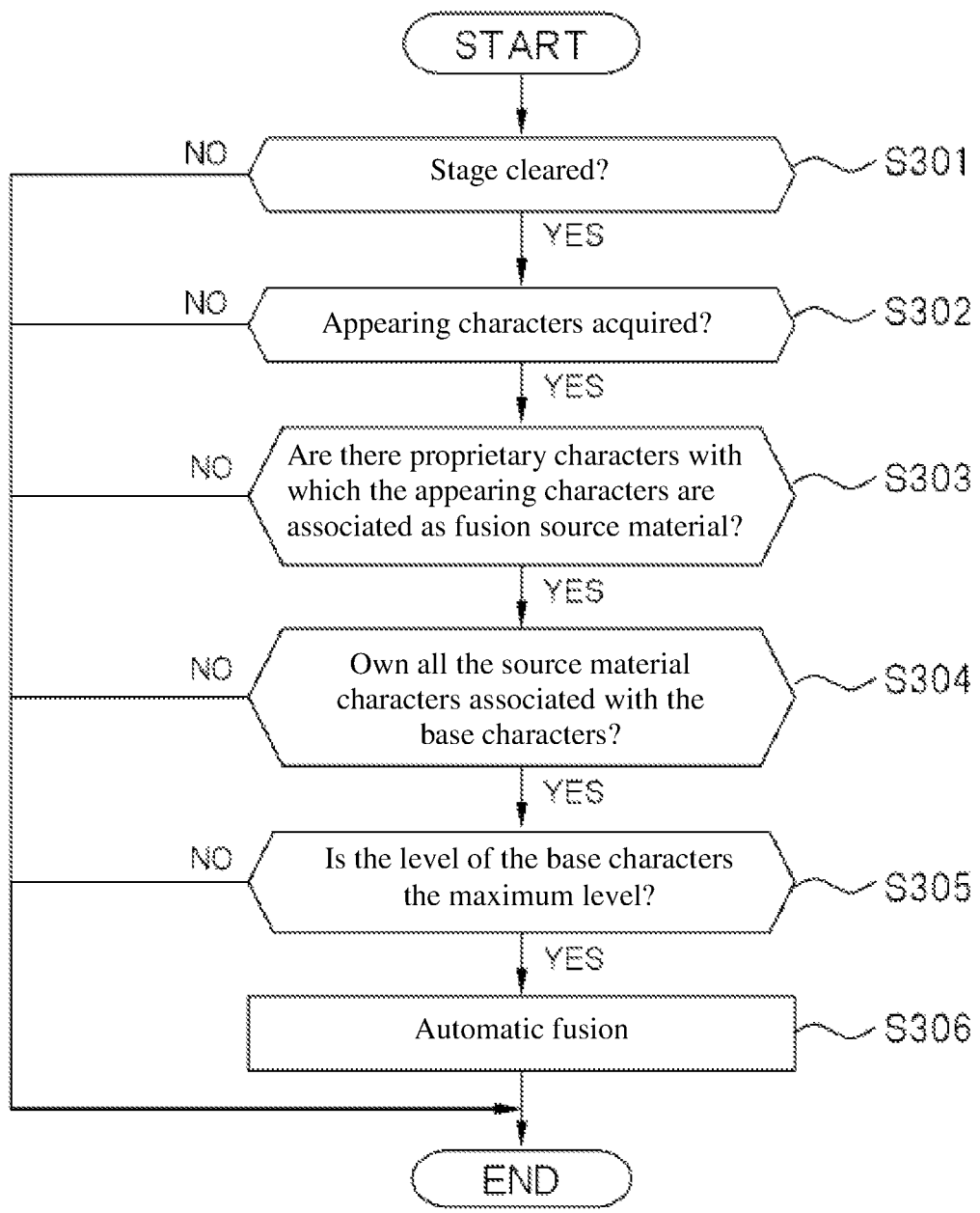
FIG. 13 A flow chart used to illustrate an example of operation related to automatic character fusion.

FIG. 13 is a flow chart used to illustrate an example of operation related to automatic character fusion. In this embodiment, automatic character fusion-related operations are carried out upon initiation of a character battle in the game stage selected by the player.

First, the battle processing module 111 determines whether or not the player has cleared the stage as a result of conducting a character battle in the game stage selected by the player (Step S301). This determination process is carried out in the same manner as the process used in Step S201 of FIG. 12.

Next, if it is determined that the player has cleared the stage (Step S301: YES), the battle processing module 111 determines whether or not the player has acquired the enemy characters appearing in this game stage (appearing characters) (Step S302). If said determination is negative, the process is terminated. On the other hand, if said determination is positive, the process advances to the next Step S303.

Next, if it is determined that the player has acquired the appearing characters (Step S302: YES), the battle processing module 111 determines whether or not the player owns base characters that are associated with the appearing characters as source material characters (Step S303). This determination process is carried out in the same manner as the process used in Step S203 of FIG. 12.

Next, if it is determined that the player owns base characters that are associated with the acquired appearing characters as source material characters (Step S303: YES), the fusion processing module 113 refers to the character information illustrated in FIG. 3, the fusion information illustrated in FIG. 4, and the proprietary character information illustrated in FIG. 7 to determine whether or not all of the source material characters associated with the proprietary base characters are owned by the player (Step S304). If said determination is negative, the process is terminated. On the other hand, if said determination is positive, the process advances to the next Step S304.

Next, if it is determined that the player owns all the source material characters (Step S304: YES), the fusion processing module 113 refers to the proprietary character information illustrated in FIG. 7 to determine whether or not the level of the proprietary base characters has reached a preconfigured maximum level (Step S305). If said determination is negative, the process is terminated. On the other hand, if said determination is positive, the process advances to the next Step S306.

Next, if it is determined that the level configured in the proprietary base characters has reached the maximum level (Step S305: YES), the fusion processing module 113 carries out automatic fusion of the proprietary base characters (Step S306). Namely, the fusion processing module 113 fuses the base characters owned by the player with all the source material characters associated with said base characters, thereby causing them to evolve into new base characters based on the character information illustrated in FIG. 3. The fusion processing module 113 then updates the proprietary character information illustrated in FIG. 7 such that the evolved base characters are characters owned by the player and all the source material characters are characters that are not owned by the player.

In this manner, once the player has successfully acquired the appearing characters associated with the game stage, the acquired appearing characters are automatically fused as fusion source material with the player's own base characters, thereby making it possible to save the time and effort required for performing character fusion-related game operations.

<Notification Screen Display>

Figure 14:
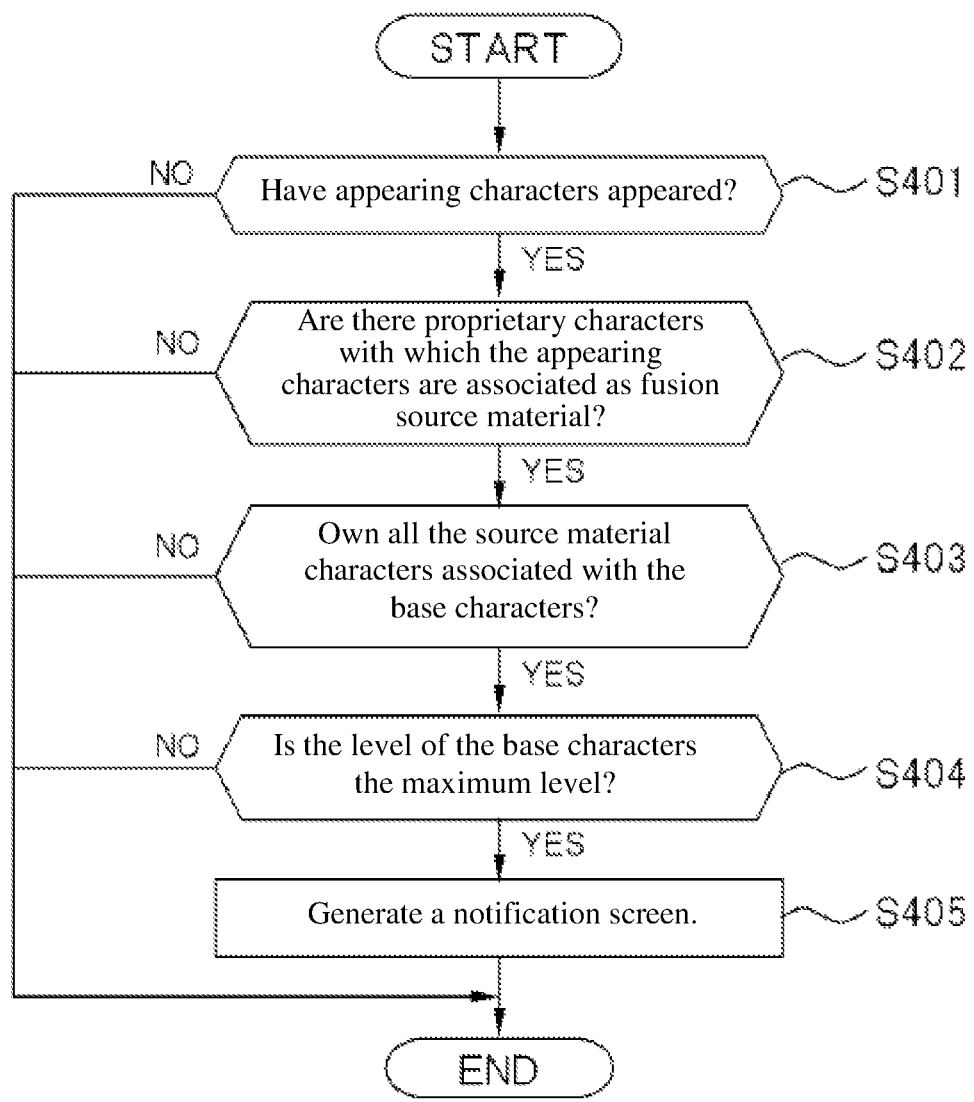
FIG. 14 A flow chart used to illustrate an example of operation related to notification screen display.

FIG. 14 is a flow chart used to illustrate an example of operation related to notification screen display. In this embodiment, notification screen display-related operations are carried out upon initiation of a character battle in the game stage selected by the player.

First, while a character battle is being conducted in the game stage selected by the player, the battle processing module 111 uses the rates of appearance configured in the game stage information illustrated in FIG. 5 to determine whether or not appearing characters have appeared (Step S401). If said determination is negative, the process is terminated. On the other hand, if said determination is positive, the process advances to the next Step S402.

Next, if it is determined that the appearing characters of this game stage have appeared (Step S401: YES), the battle processing module 111 determines whether or not the player owns base characters that are associated with the appearing characters as source material characters (Step S402). This determination process is carried out in the same manner as the process used in Step S303 of FIG. 13.

Next, if it is determined that the player owns base characters that are associated with the appearing characters as source material characters (Step S402: YES), the fusion processing module 113 determines whether or not the player owns all the source material characters associated with the proprietary base characters (Step S403). This determination process is carried out in the same manner as the process used in Step S304 of FIG. 13.

Next, if it is determined that the player owns all the source material characters (Step S403: YES), the fusion processing module 113 determines whether or not the level of the proprietary base characters has reached a preconfigured maximum level (Step S404). This determination process is carried out in the same manner as the process used in Step S305 of FIG. 13.

Next, if it is determined that the level of the proprietary base characters has reached the maximum level (Step S404: YES), the screen data generation processing module 114 generates a notification screen intended for providing a notification indicating that the appearing characters can be used as fusion source material for automatic fusion with the proprietary base characters (Step S405). After that, the server device 10 transmits the generated screen data to the player terminal 20 over the network 2.

As a result of displaying a notification screen on the player terminal 20 in this manner, the player can be notified of the fact that the appearing characters encountered in this game stage, if successfully acquired, can be used for automatic fusion with the base characters owned by the player. For this reason, the player's motivation to acquire the appearing characters encountered in the game stage can be increased.

As described above, according to the game system 1 of the present embodiment, the player can readily ascertain the base characters that are associated with the appearing characters, which may be acquired in the game stage as source material characters, prior to initiation of gameplay in said game stage. This makes it possible to save the time and effort required for performing character fusion-related game operations upon initiation of gameplay in the game stage. In addition, it is possible to allow the player to readily ascertain whether the appearing characters associated with the game stage can be utilized for character fusion.

Other Embodiments

The foregoing embodiment was intended to facilitate the understanding of the present invention and is not to be construed as limiting of the present invention. The present invention can be modified and improved without departing from its spirit and the present invention includes equivalents thereto. In particular, the embodiments described below are also included in the present invention.

<Game Stage Selection>

Although the present embodiment as described above has been discussed with reference to a case that involves executing a process to extract the base characters that are associated with the extracted appearing characters as source material characters in Step S105 of FIG. 9 and then executing a process involving further extraction of the extracted base characters from among the player's proprietary characters in the next Step S106, the process used in Step S106 can be omitted. In other words, the game stage details screen 60 may be displayed without distinguishing whether or not the player owns the base characters extracted in Step S105.

<Character Display Area>

Although the present embodiment as described above has been discussed with reference to a case in which the base characters extracted in Step S105 of FIG. 9 are displayed in the character display area 62 such that their display behavior varies depending on whether or not these are the player's proprietary characters, the present invention is not limited thereto. For example, the screen data generation processing module 114 may vary the display behavior of the base characters extracted in Step S105 of FIG. 9 according to the rate of appearance of the appearing characters associated with the game stage selected by the player. Specifically, the screen data generation processing module 114 may place the base characters that are associated with the appearing characters as source material characters in the character display area 62 by varying their display behavior such that they are displayed in a brighter color as the rate of appearance of the appearing characters increases. Accordingly, it becomes possible for the player to readily ascertain whether these are base characters that are associated with appearing characters that are likely to be acquired in the game stage or base characters that are associated with appearing characters that are unlikely to be acquired in the game stage.

In addition, in the present embodiment as described above, it is possible to display only the player's proprietary characters from among the base characters extracted in Step S105 of FIG. 9 in the character display area 62.

In addition, in the present embodiment as described above, during a battle with enemy characters appearing in a game stage, the player may be able to engage in battle using a deck made up of multiple proprietary characters, and, in such a case, from among the proprietary characters extracted in Step S106 of FIG. 9, the proprietary characters (player characters) constituting said deck may be preferentially displayed in the character display area 62. In other words, the player characters constituting the deck may be preferentially placed in the character display area 62 as some of the base characters displayed there.

In addition, in the present embodiment described above, those proprietary characters from among the proprietary characters extracted in Step S106 of FIG. 9 which have configured therein skills identical to the skills of the base characters extracted in Step S105 of FIG. 9 may be displayed in the character display area 62 differently from the proprietary characters that have different skills configured therein.

<Game System>

Although the present embodiment as described above has been discussed with reference to a case in which character battles are held in game stages, the present invention is not limited thereto. In other words, the game system 1 according to the present embodiment as described above can be applied to action games, educational games, puzzle games, and so on.

<Game Content Objects>

Although the present embodiment described above has been discussed with reference to character cards, the present invention is not limited thereto. For example, as long as it is represented by electronic game data, game content objects can be characters themselves, figures, tools or abilities used in the game, and so on.

<Server Device>

In the above-mentioned present embodiments, the explanations are given with reference to a game system 1 equipped with a single server device 10 as an example of a service device. The invention, however, is not limited thereto and a game system 1 equipped with multiple server devices 10, as an example of server devices, may also be used. In other words, multiple server devices 10 may be connected over a network 2 and these server devices 10 may perform various types of processing in a distributed manner. It should be noted that the server device 10 is an example of a computer.

<Information Processing Device>

In the game system 1 used in the above-mentioned present embodiment, the explanations are given with reference to a case in which various types of information processing are carried out by directing the server device 10 and the player terminals 20 to cooperate based on a game program (e.g., non-transitory computer readable medium having machine-executable instructions with which a computer having a storage and a hardware processor). The invention, however, is not limited thereto and the above-mentioned various types of information processing may be carried out based on the game program using the server device 10 alone or the player terminals 20 alone as information processing devices.

In addition, a configuration may be used in which the player terminals 20 support part of the information processing device functionality. In such a case, the server device 10 and player terminals 20 constitute an information processing device.

It should be noted that the information processing device is an example of a computer equipped with a processor and a memory.

DESCRIPTION OF THE REFERENCE NUMERALS

1 Game system
2 Network
10 Server device

11 Control module
12 Storage module
13 Input module
14 Display module
15 Communication module
20 Player terminal
21 Terminal control module
22 Terminal storage module
23 Terminal input module
24 Terminal display module
25 Terminal communication module
50 Game stage selection screen
51 Control button
60 Game stage details screen
61 Game stage
62 Character display area
63 Control button
111 Battle processing module
112 Extraction processing module
113 Fusion processing module
114 Screen data generation processing module
621 Base character
622 Base character
623 Base character

The invention claimed is:

1. An information processing device, which provides a game to fuse game content objects used as fusion source material with original pre-fusion game content objects, wherein said information processing device is provided with:
a storage module that stores game content information configured with game content objects and wherein the game content information manages a first set of the game content objects as fusion source material of one or more of the game content objects, and game stage information comprising a second set of the game content objects that may be acquired by the player configured therein in association with each game stage;
an extraction processing module that extracts, from multiple ones of the game content objects configured in the game content information, ones of the game content objects that are original pre-fusion game content objects configured for fusion with ones of the first set of the game content objects that are fusion source material of one or more of the second set of the game content objects that are associated with the game stage selected by the player from the multiple game stages configured in the game stage information; and
a screen data generation processing module that, prior to initiation of game play in the selected game stage, generates screen data that provides an on-screen display indicating that the extracted ones of the game content objects are the original pre-fusion game content objects that can be fused with game content objects that are fusion source material associated with the selected game stage.

2. The information processing device according to claim 1, wherein:
the storage module stores player information having configured therein a third set of game content objects owned by the player,
the extraction processing module extracts, from the third set of game content objects owned by the player, a fourth set of game content objects comprising the game content objects in the third set of game content objects that are original pre-fusion game content objects configured for fusion with the ones of the first set of game content objects which are used as fusion source material and are also part of the ones of the second set of game content objects that are associated with the selected game stage; and
the screen data generation processing module generates screen data that provides an onscreen display indicating that said extracted fourth set of game content objects of the player are original prefusion game content objects that can be fused with the game content objects, which are associated with the selected game stage as fusion source material.

3. The information processing device according to claim 2, wherein, when the player acquires the ones of the second set of the game content objects associated with said game stage after initiation of gameplay in the selected game stage, the screen data generation processing module generates screen data used to provide an on-screen display of an enquiry as to whether or not to fuse them with the player's extracted game content objects.

4. The information processing device according to claim 2, wherein the information processing device is provided with a fusion processing module that automatically fuses said extracted game content objects of the player when the player acquires the ones of the second set of the game content objects associated with said game stage after initiation of gameplay in the selected game stage.

5. The information processing device according to claim 4, wherein, when the ones of the second set of the game content objects associated with the selected game stage appear after initiation of gameplay in the selected game stage, the screen data generation processing module generates screen data that provides an on-screen display indicating that these objects are game content objects used as fusion source material that can be automatically fused with said extracted game content objects of the player.

6. The information processing device according to claim 1, wherein the screen data generation processing module generates screen data used to provide on-screen display by varying the display behavior of the extracted game content objects according to the rate of appearance configured in the ones of the second set of the game content objects associated with the selected game stage.

7. A non-transitory computer readable medium having machine-executable instructions with which a computer having a storage and a hardware processor, that provides a game to fuse game content objects used as fusion source material with original pre-fusion game content objects, the instructions comprising:
a process, whereby game content information comprising game content objects wherein a first set of the game content objects are fusion source material configured therein in association with each game content object of the game content objects, and game stage information having a second set of the game content objects that may be acquired by the player configured therein in association with each game stage, are stored in a storage module;
an extraction process that extracts, from multiple ones of the game content objects configured in the game content information, ones of the game content objects that are original pre-fusion game content objects configured for fusion with one or more of the first set of the game content objects that are fusion source material of one or more of the second set of the game content objects that are associated with the game stage selected by the player from the multiple game stages configured in the game stage information; and a screen data generation process that, prior to initiation of game play in the selected game stage, generates screen data that provides an on-screen display indicating that the extracted ones of the game content objects are the original pre-fusion game content objects that can be fused with game content objects that are fusion source material associated with the selected game stage.

8. The non-transitory computer readable medium of claim 7, wherein the process stores player information having configured therein a third set of game content objects owned by the player, the extraction process extracts, from the third set of game content objects owned by the player, a fourth set of game content objects comprising the game content objects in the third set of game content objects that are original pre-fusion game content objects configured for fusion with the ones of the first set of game content objects which are used as fusion source material and are also part of the ones of the second set of game content objects that are associated with the selected game stage; and the screen data generation process generates screen data that provides an on-screen display indicating that said extracted fourth set of game content objects of the player are original pre-fusion game content objects that can be fused with game content objects which are associated with the selected game stage as fusion source material.

* * * * *